United States Patent [19]

Huber et al.

[11] Patent Number: 5,314,531

[45] Date of Patent: May 24, 1994

[54] NON-AQUEOUS BALL POINT PEN INK

[75] Inventors: Bernhard Huber, Dülmen; Werner Freitag, Dorsten, both of Fed. Rep. of Germany

[73] Assignee: Huels Aktiengesellschaft, Marl, Fed. Rep. of Germany

[21] Appl. No.: 16,454

[22] Filed: Feb. 11, 1993

[30] Foreign Application Priority Data

Feb. 13, 1992 [DE] Fed. Rep. of Germany ....... 4204182

[51] Int. Cl.$^5$ ............................................. C09D 11/18
[52] U.S. Cl. ................... 106/22 F; 106/26 R; 106/26 A
[58] Field of Search ................ 106/22 F, 26 R, 26 A

[56] References Cited

U.S. PATENT DOCUMENTS

| | | | |
|---|---|---|---|
| 3,891,581 | 6/1975 | Argenio | 106/26 A |
| 3,961,965 | 6/1976 | Zwahlen | 106/26 R |
| 4,227,930 | 10/1980 | Lin | 106/22 B |
| 4,657,590 | 4/1987 | Gamblin | 106/22 F |
| 4,664,711 | 5/1987 | Kawaguchi et al. | 106/26 A |
| 4,671,691 | 6/1987 | Case et al. | 106/22 F |
| 4,822,417 | 4/1989 | Kobayashi et al. | 106/26 R |
| 5,013,361 | 5/1991 | Case et al. | 106/22 F |

FOREIGN PATENT DOCUMENTS 1-299880  2/1990  Japan .

*Primary Examiner*—Helene Klemanski
*Attorney, Agent, or Firm*—Oblon, Spivak, McClelland, Maier & Neustadt

[57] ABSTRACT

Non-aqueous ball point pen inks, which contain dyes, resins, solvents and additives which demonstrate improved rheological behavior under the most varied climatic conditions. Leaking and spotting are reliably avoided, and ink production is simplified. Alcohol-soluble cellulose derivatives are used as additives.

17 Claims, No Drawings

NON-AQUEOUS BALL POINT PEN INK

BACKGROUND OF THE INVENTION

1. Field of the Invention

The invention relates to non-aqueous inks for ball point pens.

2. Discussion of the Background

Non-aqueous ball point pen inks contain soluble dyes, resins, solvents, additives and other processing aids and are used to fill ball point pen cartridges.

In particular, the ink, which is generally highly viscous, is not supposed to fail at low and high temperatures. By maintaining a certain flow capacity in the ball point pen cartridge, the ability to start writing immediately and continuous writing must be assured even at low ambient temperatures. On the other hand, even at tropical temperatures, running and spotting should not occur. Furthermore, no droplet formation at the ball point pen tip should occur due to the effect of moisture, even in the form of high humidity.

Ball point pen inks, containing soluble dyes, synthetic resins, solvents, and oleic acid, respectively are known (Seifen-Öle-Fette-Wachse 109, 16/1983, pages 481 to 483).

Attempts have been made to improve the control of viscosity, the ability to start writing and the friction wear resistance by using a synthetic resin and polyvinyl pyrrolidone, dissolved in benzyl alcohol or higher glycols, as a thickener (Seifen-Öle-Fette-Wachse 103, 3/1977, page 76). By adding a resin, the viscosity of the ink at room temperature can be adjusted to the desired value. Usually, values in the vicinity of 10,000 to 20,000 mPa.s are found. In this connection, resins which contain hydroxyl groups yield the highest values, with the same throughput amount. As in the case of hydrogenated ketone resins and styrene/allyl alcohol copolymers, they also demonstrate the relatively flattest viscosity/temperature curve. Other binders, such as oil-free alkyd resins, ketone or aldehyde resins, change the viscosity very greatly when the temperature changes, or they are unstable in a ink, such as a novolak, and result in a decrease in viscosity after only a short time.

In general, all of the previously known binders and resins are insufficient as a sole viscosity regulator. Furthermore, an overly high proportion of resin in the ink formulation is undesirable for reasons of production ease and handling of the ink, adjustment of the color intensity and permanence, and partly for price reasons. Polyvinyl pyrrolidone, which is described in the literature, is used as a thickener to increase viscosity. At proportions of about 3% by weight of the total ink, a clear increase in viscosity can be achieved.

However, the problems associated with temperature changes have not been eliminated. Particularly at higher temperatures, such as those which occur in the summer or in the tropics, a large decrease in viscosity of the inks is not prevented or reduced. Another problem is the great sensitivity to moisture of any kind. Thus, slight amounts of water, such as those which can be contained in other ink raw materials, drastically reduce the ink viscosity. If ball point pens are exposed to high humidity, droplet formation occurs in the tip region, or in the case of open cartridges, the ink leaks out.

SUMMARY OF THE INVENTION

Accordingly, one object of the invention is to provide a ball point pen ink which demonstrates improved viscosity/temperature behavior and less sensitivity to moisture. The ink should provide good writing behavior under changing external influences, and allow broad tolerances in the raw material qualities and the production conditions.

These and other objects which will become apparent from the following specification have been achieved by the non-aqueous ball point pen ink of the invention containing dyes, resins, solvents and additives, which is characterized by containing 0.01 to 10% by weight, preferably 0.1 to 1.0% by weight of an alcohol-soluble cellulose derivative. Preferred alcohol-soluble cellulose derivatives are hydroxypropyl cellulose, hydroxyethyl cellulose, ethyl hydroxyethyl cellulose and ethyl cellulose. Hydroxypropyl cellulose is especially preferred. Mixtures of different cellulose derivatives are also suitable.

DETAILED DESCRIPTION OF THE PREFERRED EMBODIMENTS

The ball point pen ink of the present invention has several advantages which overcome the problems associated with prior art inks. In particular, one can produce ball point pen inks which continue to write well and do not leak, even at very low and very high ambient temperatures and very high humidity. Furthermore, requirements concerning the raw materials, such as various water contents or melting points, can be lowered. The viscosity range associated with known inks can be significantly increased, which saves complicated corrective measures even when raw material quality and production conditions vary.

For the production of the ball point pen ink according to the invention, all usual and known dyes can be used in amounts of about 15 to 35% by weight. Often, cationic dyes, such as Astra, Brilliant and Victoria blue bases, are made soluble with oleic acid. These dyes are not indelible. Indelible blue inks can be obtained by combination with soluble phthalocyanine bases. Black color is obtained by combination of a copper phthalocyanine base with a nigrosine base; green is obtained, for example, by using Brilliant Green salt AF. All other color tones can also be used. The use of dyes is not at all restricted by the present invention, rather it is expanded, since the ink of invention makes it easier to balance the influence of the various dyes on viscosity.

The ball point pen inks according to the invention may contain the usual conventional resins and binders in amounts of 10 to 40% by weight. Ketone resins and aldehyde resins, such as acetophenone/formaldehyde resins, hydrogenated acetophenone/formaldehyde resins, urethanized acetophenone/formaldehyde resins, ethylene urea/formaldehyde resins, isobutyraldehyde/urea/formaldehyde resins, cyclohexanone/formaldehyde resins, alkyl cyclohexanone/formaldehyde resins, cyclohexanone resins, and methyl ethyl ketone/formaldehyde resins can be used. Partially hydrogenated acetophenone/formaldehyde resins, the ketone groups of which can be converted to hydroxyl groups, are especially preferred. Furthermore, allyl alcohol polymers are also suitable, with styrene/allyl alcohol copolymers being preferred.

Another group of resins suitable for ball point pen inks is the phenolic resins. As a rule, completely condensed phenolic formaldehyde resins, the so-called novolaks, are used. Of course, all substituted phenols and phenol derivatives can be used to produce the resins. A prerequisite for their use in ball point pen inks is, as for all other resins, their solubility in the solvents used and in the ink as a whole. A selection of resins is found in Karsten, Lackrohstofftabellen, 8th edition, Curt R. Vincentz Verlag, Hanover, 1987.

Alkyd and polyester resins, which should be oil-free, are also used in ball point pen inks. Mostly, these are phthalate resins, which are obtained by condensation of the various phthalic acids with polyalcohols. Furthermore, other resins are also possible. Of course, the resins can also be used in combination with each other.

Suitable solvents for the ball point pen inks according to the invention are considered to be all the solvents which are named in or can be deduced from the literature, and their mixtures, in amounts of about 45 to 70% by weight. Solvents with a higher boiling point, which contain hydroxyl groups, such as a glycols (preferably $C_{2-12}$ glycols), glycol ethers (preferably $C_{3-12}$ aliphatic glycol ethers) and alcohols (preferably $C_{6-12}$ aryl and aralkyl alcohols), are particularly useful. For example, the following are used: phenyl glycol, 1,2-propane diol, ethylene diglycol, butylene diglycol, dipropylene glycol, 2-ethyl-1,3-hexane diol, diethylene glycol, triethylene glycol, phenoxyethanol and benzyl alcohol. Furthermore, fatty acids, (preferably $C_{12-30}$ fatty acids) such as oleic acid, and natural or synthetic oils, such as castor oil, are used. Specially preferred solvents are phenyl glycol, benzyl alcohol and phenoxyethanol. Water is precluded as a solvent, but can be contained in the ball point pen inks according to the invention as a contaminant, in up to about 10% by weight.

Additives and processing aids, such as thickeners, can also be added to the ball point pen inks according to the invention. Of course, all other conventional additives can also be used if they demonstrate advantages in production, processing or use of the inks. Polyvinyl pyrrolidone or mineral oil thickened with aluminum stearate are known and can be used as thickeners. The additives (including the alcohol-soluble cellulose derivatives) are used in amounts of about 0.01 to 10% by weight, preferably 0.1–5% by weight. In many cases, additional additives can be eliminated entirely from the ball point pen inks according to the invention, which represents a simplification of the formulation.

The cellulose derivatives according to the invention must be alcohol-soluble, i.e., they should be soluble in at least one of the solvents containing hydroxyl groups listed above. Alcohol-soluble cellulose derivatives include alcohol-soluble cellulose esters (preferably cellulose esters of $C_{2-16}$ carboxylic acids and of aceto-$C_{2-8}$ carboxylic acids) and cellulose ethers (preferably $C_{1-4}$ alkyl celluloses and $C_{1-4}$ hydroxyalkyl celluloses). Suitable alcohol-soluble cellulose derivatives are well known and commercially available. See, for example, Kirk-Othmer, Encyclopedia of Chemical Technology, 1979, Volume 5, pages 118–163. Specific alcohol-soluble cellulose derivatives are, for example, hydroxylpropyl cellulose, hydroxyethyl cellulose, ethyl hydroxyethyl cellulose, ethyl cellulose, cellulose acetobutyrate and cellulose acetopropionate. Hydroxypropyl cellulose, hydroxyethyl cellulose and ethyl cellulose are highly effective in this invention. In general, the effectiveness increases with an increasing viscosity of the cellulose derivative. The use of hydroxypropyl cellulose is preferred, since it permits the most advantageous dissolving behavior, stable homogeneous solutions and the best rheological properties.

Other features of the invention will become apparent in the course of the following descriptions of exemplary embodiments which are given for illustration of the invention and are not intended to be limiting thereof.

EXAMPLES

Example 1

Production of the base ink

The following formulation components were dissolved in each other, while stirring:

| Raw Material | A (according to the invention) parts | B (Comparison) parts | C (Comparison) parts |
|---|---|---|---|
| Phenoxyethanol | 60.0 | 60.0 | 60.0 |
| Hydroxypropyl cellulose (25 Pa · s) | 0.5 | — | — |
| Polyvinyl pyrrolidone | — | 3.0 | — |
| Partially hydrogenated ketone resin *) | 40.0 | 40.0 | 40.0 |
| Measured value Viscosity | Pa · s | Pa · s | Pa · s |
| 23° C. | 2.0 | 1.9 | 1.5 |
| 50° C. | 1.0 | 0.5 | 0.3 |

*) synthetic resin SK (modified acetophenone/formaldehyde resin of Hüls AG, Marl

Example 2

Production of the ball point pen ink and testing of leakage behavior

By mixing 100 parts each of the base inks A, B and C from Example 1, with 60 parts triacrylic methane dye C.I. Basic Blue 8 (BASONYL Blue 633 of BASF AG, Ludwigshafen), ball point pen inks A, B and C were produced. In order to test the leakage behavior, all three inks were diluted to the critical viscosity of 4 to 5 Pa• s, using phenoxyethanol. It is known from empirical evidence that cartridges spot and leak at this viscosity. The test was carried out by conducting writing at the temperatures indicated, and leakage tests with cartridges that were open at the top.

| Temperature °C. | Leakage Behavior | | |
|---|---|---|---|
| | A | B | C |
| 23 | + | + | — |
| 35 | + | + | — |
| 50 | + | — | — |
| 80 | + | — | — |

+ ink does not run out/does not spot
− ink runs out/spots

Example 3

Low-temperature test

The inks from Example 2 were adjusted to 15 Pa•s, filled into cartridges and exposed to storage at −20° C. The results of the writing test showed that the additives hydroxypropyl cellulose (A) and polyvinyl pyrrolidone (B) did not cause any worsening of writing performance as compared with ambient temperature.

Example 4

Moisture test of base ink

The base inks A and B from Example 1 were mixed with water, step by step, and the resulting viscosity was measured.

| Water added | Viscosity at 23° C. Pa · s | |
|---|---|---|
| % by weight | A | B |
| 0 | 2.0 | 1.9 |
| 0.5 | 2.1 | 1.5 |
| 1.0 | 2.0 | 1.0 |
| 1.5 | 2.0 | 1.0 |

Example 5

Moisture test—writing behavior

The ball point pen inks A and B from Example 2 were again adjusted to 15 Pa•s, filled into cartridges and stored in a climate chamber at 35° C. and 100% relative humidity for 1 day. During the subsequent writing test, ink B demonstrated spotting in the initial writing phase, but ink A did not.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A non-aqueous ball point pen ink containing a dye, resin and solvent, said ink comprising 0.01 to 10% by weight of an alcohol-soluble cellulose compound and having a viscosity in the range of 2-15 Pa•s at 23° C.

2. The non-aqueous ball point pen ink of claim 1, wherein said cellulose compound is selected from the group consisting of $C_{1-4}$ alkyl cellulose ethers, $C_{1-4}$ hydroxyalkyl cellulose ethers, cellulose esters of $C_{2-16}$ carboxylic acids and cellulose esters of aceto-$C_{2-8}$ carboxylic acids.

3. The non-aqueous ball point pen ink of claim 1, wherein said cellulose compound is selected from the group consisting of hydroxypropyl cellulose, hydroxyethyl cellulose, ethyl hydroxyethyl cellulose, ethyl cellulose, cellulose acetobutyrate and cellulose acetopropionate.

4. The non-aqueous ball point pen ink of claim 1, wherein said cellulose is hydroxypropyl cellulose.

5. The non-aqueous ball point pen ink of claim 1, wherein said cellulose is selected from the group consisting of hydroxyethyl cellulose, ethyl hydroxyethyl cellulose or ethyl cellulose.

6. The non-aqueous ball point pen ink of claim 1, comprising a resin selected from the group consisting of ketone resins, aldehyde resins, and allyl alcohol polymers.

7. The non-aqueous ball point pen ink of claim 1, wherein said resin is a ketone or aldehyde resin selected from the group consisting of acetophenone/formaldehyde resins, hydrogenated acetophenone/formaldehyde resins, urethanized acetophenone/formaldehyde resins, ethylene urea/formaldehyde resins, isobutyraldehyde/urea/formaldehyde resins, cyclohexanone/formaldehyde resins, alkyl cyclohexanone/formaldehyde resins, cyclohexanone resins and methyl ethyl ketone/formaldehyde resins.

8. The non-aqueous ball point pen ink of claim 1, wherein said resin is selected from the group consisting of partially hydrogenated acetophenone/formaldehyde resins and styrene/allyl alcohol copolymers.

9. The non-aqueous ball point pen ink of claim 1, comprising a solvent selected from the group consisting of glycols, glycol ethers and alcohols.

10. The non-aqueous ball point pen ink of claim 6, comprising a solvent selected from the group consisting of benzyl alcohol and phenoxyethanol.

11. A method for improving the viscosity/temperature behavior of a ball point pen ink and reducing the sensitivity of the ink to moisture, comprising adding 0.01 to 10% by weight of an alcohol-soluble cellulose compound to a ball point pen ink containing a dye, resin and solvent, said ink having a viscosity of 2-15 Pa•s at 23° C.

12. The non-aqueous ball point pen ink of claim 1, wherein said solvent is a $C_{6-12}$ aryl alcohol.

13. The non-aqueous ball point pen ink of claim 1, wherein said solvent is a $C_{6-12}$ aralkyl alcohol.

14. The non-aqueous ball point pen ink of claim 1, wherein said solvent is a $C_{12-30}$ fatty acid.

15. The non-aqueous ball point pen ink of claim 10, wherein said solvent is phenoxyethanol.

16. The non-aqueous ball point pen ink of claim 1, wherein said solvent is selected from the group consisting of 1,2-propane diol, ethylene diglycol, butylene diglycol, dipropylene glycol, 2-ethyl-1,3-hexane diol, diethylene glycol, triethylene glycol, oleic acid and castor oil.

17. A non-aqueous ball point pen ink containing a dye and resin, said ink comprising 0.01 to 10% by weight of an alcohol-soluble cellulose compound, 45 to 70% by weight of a solvent selected from the group consisting of $C_{6-12}$ aralkyl alcohols and $C_{12-30}$ fatty acids, said ink having a viscosity of 2-15 Pa•s at 23° C.

* * * * *